United States Patent
Bishop et al.

(10) Patent No.: US 10,025,624 B2
(45) Date of Patent: Jul. 17, 2018

(54) PROCESSING PERFORMANCE ANALYZER AND PROCESS MANAGER

(71) Applicant: International Business Machines Corporation, Armonk, NY (US)

(72) Inventors: Adam T. Bishop, Roanoke, VA (US); Glenn P. Crawford, Cary, NC (US); Rocky D. McMahan, Raleigh, NC (US); Cecil C. Smith, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 15/085,472

(22) Filed: Mar. 30, 2016

(65) Prior Publication Data

US 2017/0286177 A1    Oct. 5, 2017

(51) Int. Cl.
| | | |
|---|---|---|
| G06F 9/46 | (2006.01) | |
| G06F 9/48 | (2006.01) | |
| G06F 9/50 | (2006.01) | |
| G06F 15/82 | (2006.01) | |

(52) U.S. Cl.
CPC .............. *G06F 9/4881* (2013.01); *G06F 9/48* (2013.01); *G06F 9/485* (2013.01); *G06F 9/4806* (2013.01); *G06F 9/4843* (2013.01); *G06F 9/50* (2013.01); *G06F 9/5005* (2013.01); *G06F 9/5027* (2013.01); *G06F 9/5044* (2013.01); *G06F 9/5083* (2013.01); *G06F 15/82* (2013.01)

(58) Field of Classification Search
None
See application file for complete search history.

(56) References Cited

U.S. PATENT DOCUMENTS

| | | | |
|---|---|---|---|
| 8,352,948 B2 | 1/2013 | Laviolette | |
| 8,365,182 B2 | 1/2013 | Groetzner et al. | |
| 8,843,894 B2* | 9/2014 | Dawson | G06F 9/5027 717/124 |
| 8,910,130 B2 | 12/2014 | Munster et al. | |
| 8,935,516 B2* | 1/2015 | Driscoll | G06F 9/46 712/229 |
| 9,218,226 B2 | 12/2015 | Lubrano | |
| 9,218,401 B2 | 12/2015 | Dee et al. | |
| 2007/0300045 A1* | 12/2007 | Farmer | G01S 19/37 712/34 |

(Continued)

*Primary Examiner* — Charles M Swift
(74) *Attorney, Agent, or Firm* — Cantor Colburn LLP; Margaret A. McNamara

(57) ABSTRACT

Embodiments include method, systems and computer program products for z Integrated Information Processors (zIIP) processing performance analysis and process management. In some embodiments, at least a portion of an application may be executed using a general-purpose processor of a mainframe computing device, wherein the at least the portion of the application comprises a zIIP-enabled process. A first set of data associated with the general-purpose processor may be collected. At least a portion of the application may be executed using a zIIP of the mainframe computing device. A second set of data associated with the zIIP may be collected. An efficiency percentage may be calculated using the first set of data and the second set of data. A portion of the application may be authorized to execute on the zIIP based on the efficiency percentage.

17 Claims, 4 Drawing Sheets

(56) References Cited

U.S. PATENT DOCUMENTS

| | | | |
|---|---|---|---|
| 2009/0164755 A1* | 6/2009 | Bell, Jr. | G06F 9/3851 |
| | | | 712/30 |
| 2009/0222654 A1* | 9/2009 | Hum | G06F 1/3203 |
| | | | 713/100 |
| 2012/0291040 A1* | 11/2012 | Breternitz | G06F 9/5083 |
| | | | 718/104 |
| 2013/0047155 A1* | 2/2013 | Caspole | G06F 9/445 |
| | | | 718/1 |
| 2013/0235992 A1* | 9/2013 | Dawson | G06F 9/5027 |
| | | | 379/201.02 |
| 2014/0298346 A1* | 10/2014 | Zakashansky | G06F 9/5033 |
| | | | 718/104 |

* cited by examiner

PROCESSING PERFORMANCE ANALYZER AND PROCESS MANAGER

BACKGROUND

The present disclosure relates to data processing, and more specifically, to methods, systems and computer program products for processing performance analysis and process management.

Mainframe computers are computers that are used primarily by large organizations for critical applications, bulk data processing (e.g., census, industry and consumer statistics), enterprise resource planning, and transaction processing. An example of a mainframe computer is a IBM zSeries mainframe computer, which may include multiple processing units, such as general-purpose processors and special purpose processors (e.g., z Integrated Information Processors (zIIPs)). zIIPs are special processors intended to offload the general-purpose processor of the mainframe computer system. These processors do not contain microcode or hardware features that accelerate their designated workload. Instead, the zIIPs may be financially different in that they perform increasing system capacity for targeted workloads without raising the operating system (e.g., z/OS, which is the operating system for mainframe computers produced by IBM) and/or third party software license fees as would be the case if the workload was performed by the general processor.

A general processor of the mainframe computer system may be available to run all workloads (e.g., task control block (TCB) or service request block (SRB)) while the z/OS operating system may only run enclave SRB type workloads on a zIIP. Additionally, the z/OS operating system may only consider SRBs that are part of an enclave and only enclaves that conform to IBM's propriety interface to be eligible for zIIP execution. Running on a zIIP instead of a general-purpose processor may provide cost savings. However, because the zIIP is a limited resource, running some processes on a zIIP could prevent other processes from running on the zIIP. In some embodiments, some software that is zIIP-enabled may not be as suitable for a zIIP as other software. There may be an overhead cost of running software on a zIIP. In some cases the overhead cost may be so high, that it offsets most or all of the potential savings from running the software on the zIIP.

SUMMARY

In accordance with an embodiment, a method for processing performance analysis and process management is provided. The method may include executing at least a portion of an application using a general-purpose processor of a mainframe computing device, wherein the at least the portion of the application comprises a special purpose processor-enabled process; collecting a first set of data associated with the general-purpose processor; executing the at least a portion of the application using a special purpose processor of the mainframe computing device; collecting a second set of data associated with the special purpose processor; calculating an efficiency percentage using the first set of data and the second set of data; and determining to authorize the at least the portion of the application to execute on the special purpose processor based on the efficiency percentage.

In another embodiment, a computer program product may comprise a non-transitory storage medium readable by a processing circuit and storing instructions for execution by the processing circuit for performing a method that may include executing at least a portion of an application using a general-purpose processor of a mainframe computing device, wherein the at least the portion of the application comprises a special purpose processor-enabled process; collecting a first set of data associated with the general-purpose processor; executing the at least a portion of the application using a special purpose processor of the mainframe computing device; collecting a second set of data associated with the special purpose processor; calculating an efficiency percentage using the first set of data and the second set of data; and determining to authorize the at least the portion of the application to execute on the special purpose processor based on the efficiency percentage.

In another embodiment, a system may include a general-purpose processor and a special purpose processor, wherein the general-purpose processor in communication with one or more types of memory, the processor configured to execute at least a portion of an application using a general-purpose processor of a mainframe computing device, wherein the at least the portion of the application comprises a special purpose processor-enabled process; collect a first set of data associated with the general-purpose processor; execute the at least a portion of the application using a special purpose processor of the mainframe computing device; collect a second set of data associated with the special purpose processor; calculate an efficiency percentage using the first set of data and the second set of data; and determine to authorize the at least the portion of the application to execute on the special purpose processor based on the efficiency percentage.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for zIIP processing performance analysis and process management are provided. The methods and systems described herein are directed to calculating the cost of running programs or software containing zIIP-enabled programs over time and then determining whether it is cost-effective to execute the programs or software on a zIIP. In some embodiments, a separate or integrated tool or program may be used to monitor and collect data associated with executing a portion of the complete program or software on only the general-purpose processor as well as on both the general-purpose processor and zIIP to determine the overhead cost of off-loading a process to a zIIP, the cost saving of running the process on a zIIP and the net savings of running the process on the zIIP as a percentage of the total cost of running the process. If the net savings is below a desired percentage, the process would no longer run on the zIIP for the remaining life of the process.

In some embodiments, it may be determined that an evaluation has been requested. The evaluation may comprise two phases of data collection. The first phase would include identifying a program or software that includes zIIP-enabled processes and only executing the program on one or more general-purpose processors. Data, such as CPU usage data, may be collected during this phase. During the second phase, the program or software would be executed for the same time and/or repetitions, with zIIP-enabled processes permitted to execute on zIIP. Data may be collected during this second phase. The data collected during the first and second phases may be used to determine an amount of CPU time used by the zIIP-enabled process, both when the process could not run on the zIIP as well as when the process was permitted to execute on the zIIP. The amount of zIIP time used by the process during the second phase may be calculated and compared to the non-zIIP CPU time used by the process during the first phase to determine the off-load percentage. The net change in CPU time usage may be calculated, and the net change may be compared to the zIIP time. The net change compared to the zIIP off-load may be used to determine an efficiency percentage. If the efficiency percentage is below a set threshold, the process would no longer be authorized to execute on the zIIP. Options may be set to evaluate all zIIP-enabled processes, or just specific ones. Options may also request periodic re-evaluation of some or all of the zIIP-enabled processes.

Figure 1:
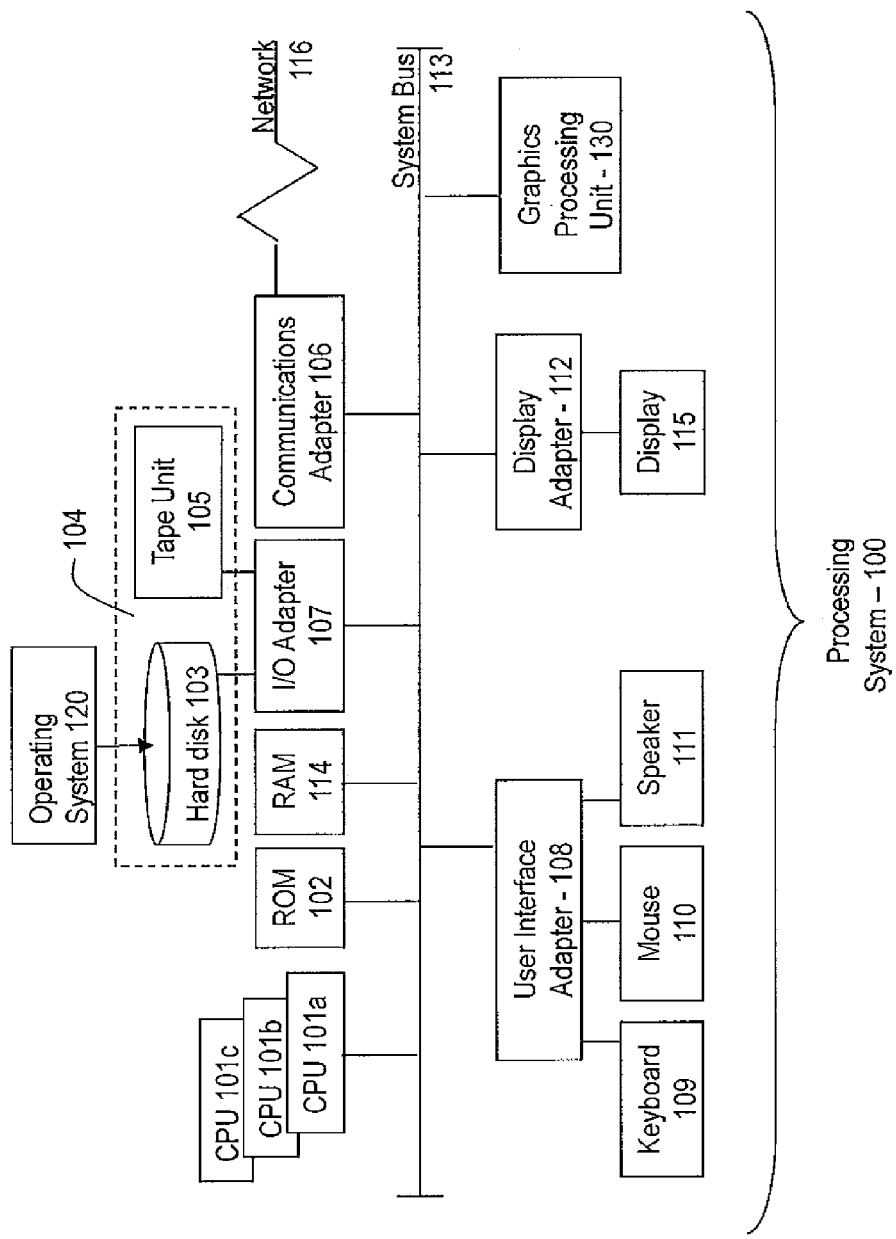
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
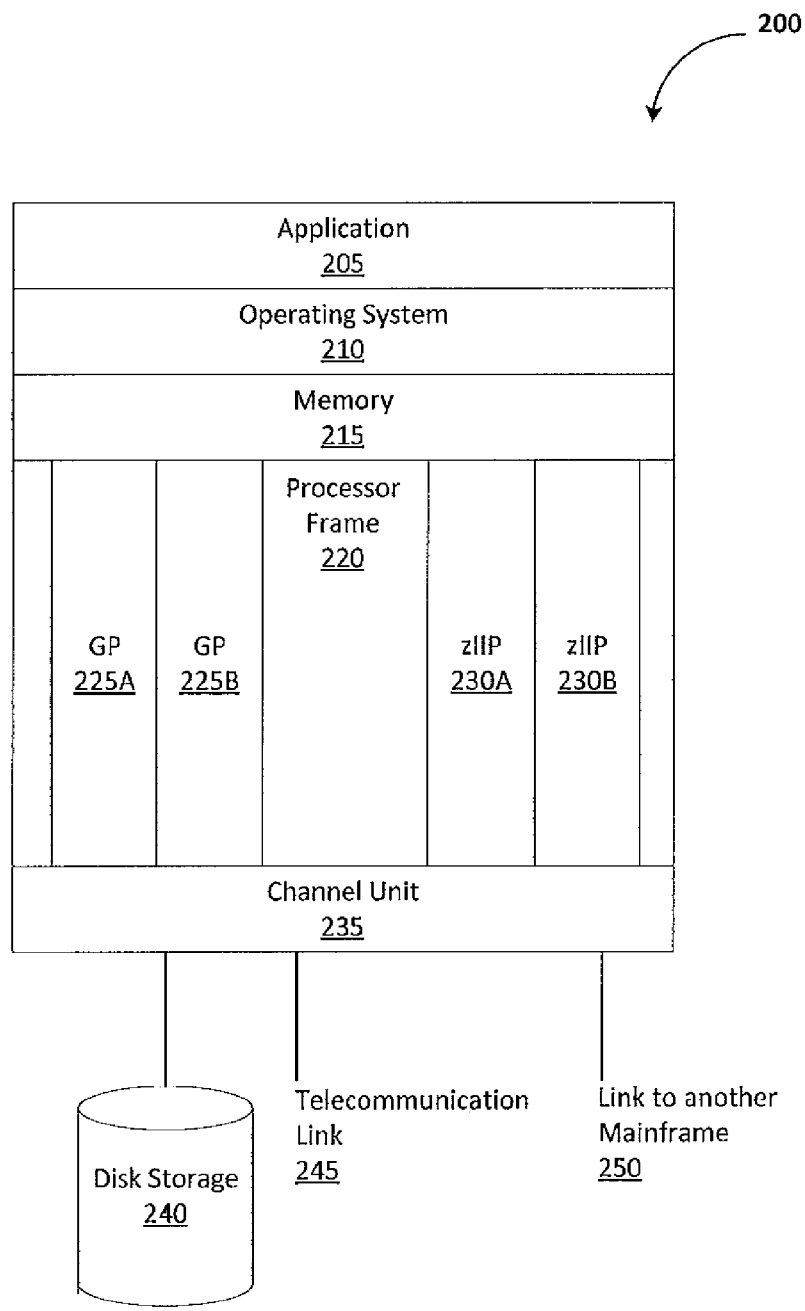
FIG. 2 is a block diagram illustrating one example of a processing system for practice of teachings herein.

Referring now to FIG. 2 illustrates a mainframe computer system 200 (e.g., IBM® zSeries® mainframe computer) for implementing the teachings herein. The mainframe computer 200 may include memory 215 (e.g., Read Only Memory (ROM), Random Access Memory (RAM)), a processor frame 220, a plurality of General Processors (GPs) 225A-225B and a plurality of System z Integrated Information Processors (zIIPs) 230A-230B within processor frame 220, a channel unit 235 for processing Input/Output (I/O) requests (which may be a network interface or some other communication link such as a communication bus), a connection to another mainframe 250 (which may be a network interface or some other communication link such as a communication bus), a telecommunications link 245 and a disk storage device 240 sometimes referred to as Direct Access Storage Device (DASD). General processors 225A-225B may collectively or individually be referred to as general processors 225 or general processor 225, respectively. Furthermore, zIIPs 230A-230B may collectively or individually be referred to as zIIPs 230 or zIIP 230, respectively.

A zIIP 230 may be a special purpose processor intended to offload the general processor 225 of mainframe computer system 200. zIIPs 230 may not contain microcode or hardware features that accelerate their designated workload. Instead, they may permit increasing system capacity for targeted workloads without raising z/OS® and/or third party software license fees as would be the case if this workload was performed by general processors 225.

Mainframe computer system 200 may further include an operating system 210, such as the z/OS® operating system for the zSeries® mainframe computer. A more detailed description of operating system 210 is provided below in connection with FIG. 3.

The mainframe computer system 200 may include an application 205 that contains eligible zIIP executable code. Application 205, which may be a single program or a span of multiple programs, does not need to be entirely restructured in order for its eligible zIIP executable code to be executed on zIIP 230 as discussed in greater detail further below. It is noted that software components including operating system 210 and application 205 may be loaded into RAM 215, which may be mainframe computer system's 200 main memory for execution.

While FIG. 2 illustrates mainframe computer system 200 including two general processors 225 and two zIIPs 230, the mainframe computer system 200 may include any number of general processors 225 and zIIPs 230. Furthermore, mainframe computer system 200 is not to be limited in scope to any one particular architecture. For example, a single physical mainframe 200 may also be subdivided into multiple Logical Partitions (LPARs). A LPAR is a logical segmentation of a mainframe's memory and other resources that allows it to run its own copy of an operating system and associated applications. LPARs may be enabled via special hardware circuits or purely through software. LPARs may also allow multiple system images (of the same operating system or different operating systems) to run in one machine. Furthermore, each LPAR can execute one or more subsystems within an operating system. A subsystem is a service provider that performs one or more functions, but does nothing until it is requested. Examples of mainframe subsystems include Customer Information Control System (CICS), Information Management System (IMS), Resource Access Control Facility (RACF). When an LPAR is configured, a system administrator may designate which physical hardware resources are available, either in whole or in part, to that particular LPAR.

Figure 3:
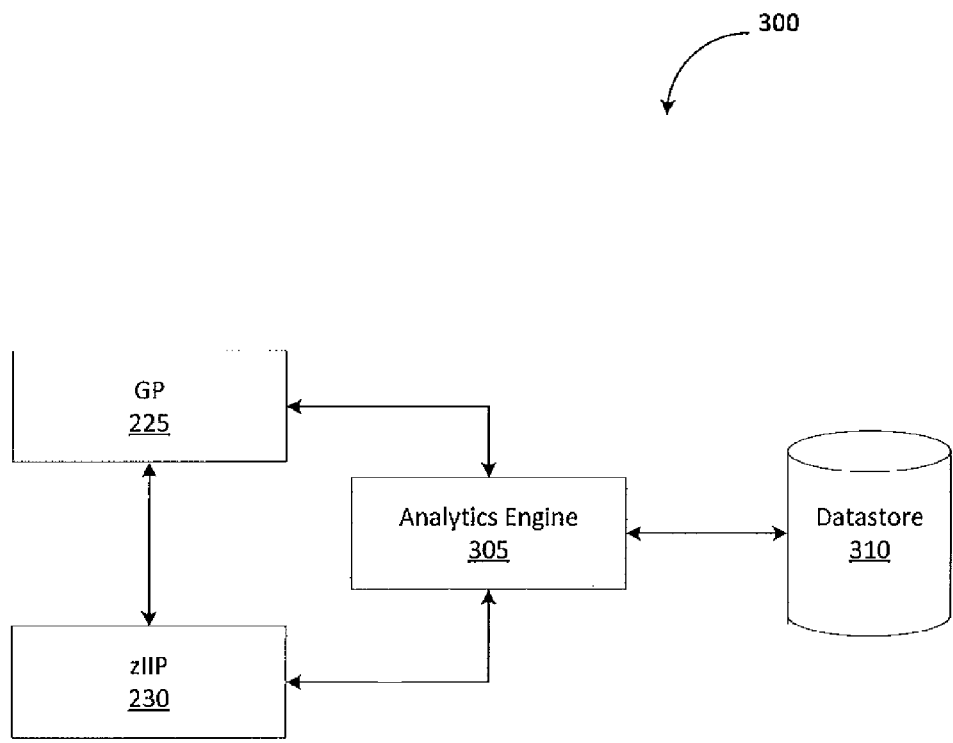
FIG. 3 is a block diagram illustrating a computing system in accordance with an exemplary embodiment.

Referring to FIG. 3, a block diagram illustrating a computing system 300 in accordance with an exemplary embodiment is depicted. FIG. 3, in conjunction with FIG. 2, depicts an operating system 210 that may include an analytics engine 305. The analytics engine 305 may monitor and analyze performance of processes on general processors 225 and zIIPs 230. In some embodiments, the analytics engine 305 may transmit the performance data of the general processors 225 and/or zIIPs 230 to one or more datastores 310. The datastores 310 may store the performance data until the analytics engine 305 retrieves them for further analysis. In some embodiments, the analytics engine 305 may obtain the performance data from the datastores 310 and/or from the general processors and/or zIIPs 230 and may use the data in performance analysis based on the execution of the respective processors. Using analyzed performance data, the analytics engine 305 may determine whether to authorize execution of the processes on zIIPs 230 in the future. Different aspects and functionality of the analytics engine 305 are discussed further below in connection with FIG. 4.

Figure 4:
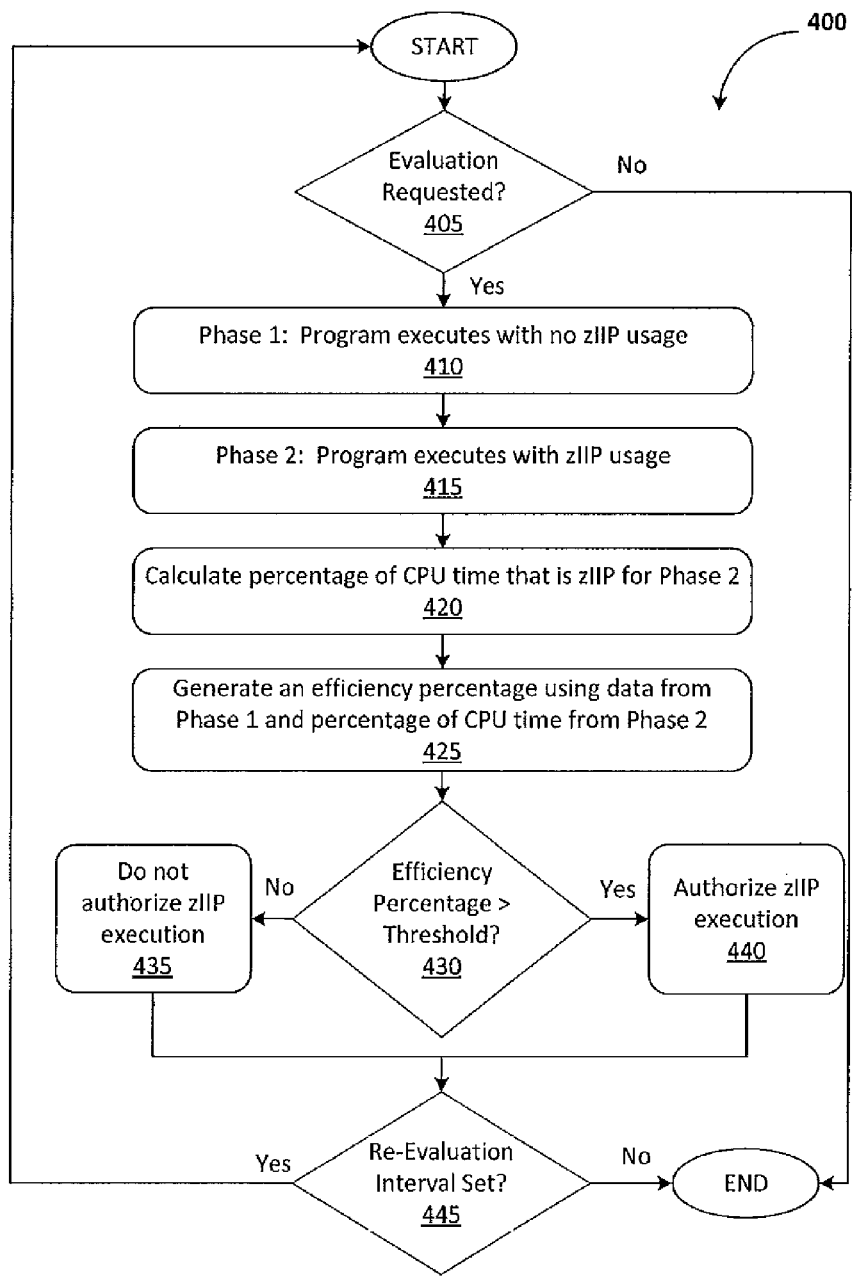
FIG. 4 is a flow diagram of a method for zIIP processing performance analysis and process management in accordance with an exemplary embodiment.

FIG. 4 is a flow diagram of a method 400 for zIIP processing performance analysis and process management in accordance with an exemplary embodiment.

At block 405, the analytics engine 305 may determine whether an evaluation was requested. If an evaluation was not requested, the method may terminate. If an evaluation was requested, then the method may proceed to block 410. In some embodiments, the analytics engine 305 may determine whether an evaluation was requested by reviewing a response to an inquiry to a user or administrator of the system for a request for evaluation. If the user response (e.g., selects YES or NO in response to a prompt), the response may be captured and transmitted to the analytics engine 305. The analytics engine 305 analyzes the response to determine if an evaluation was requested. In some embodiments, the analytics engine 305 may obtain a profile associated with a user and/or administrator and may analyze the profile to determine whether an evaluation of one or more processes should be evaluation. For example, in some embodiments, the user may have designated in their user profile or preferences to always evaluate all zIIP-enabled processes, to evaluation only zIIP-enabled processes that meet a certain criteria specified by the user, and/or to only evaluate zIIP-enabled processes when requested by the user.

At block 410, phase 1 may be executed by the analytics engine 305. In phase 1, the analytics engine 305 may facilitate execution of (or at least a portion of) an identified application and collect data associated with the execution. The identified application may include a special purpose processor—enabled (e.g., zIIP-enabled) processes. During phase 1, the identified application may be executed on a general-purpose processor 225 and not a zIIP. The identified application may be executed for a pre-determined interval of time or a pre-determined number of repetitions. During the execution of the application, the analytics engine 305 may obtain metrics associated with the execution of the application on the general-purpose processor 225. In some embodiments, the pre-determined interval of time or pre-determined number of repetitions may be designated by the user or an administrator of the system. In some embodiments, the pre-determined interval of time or pre-determined number of repetitions may be saved to a profile associated with the user and/or the application. In some embodiments, the pre-determined interval of time or pre-determined number of repetitions may be set or dynamically modified by the analytics engine 305. In some embodiments, the analytics engine 305 may use data from previous executions of the application or data obtained from the execution of other processes or applications. In some embodiments, the analytics engine 305 may collect CPU usage data associated with the execution of the application on the general-purpose processor 225. In some embodiments, the analytics engine 305 may transmit the CPU usage data to a datastore 310.

At block 415, phase 2 may be executed by the analytics engine 305. In phase 2, the analytics engine 305 may facilitate execution of the identified application, permitting zIIP 230 usage for zIIP-enabled processes of the application and may collect data associated with the execution. During phase 2, the identified application may be executed with permitted zIIP 230 usage for the same pre-determined interval of time or pre-determined number of repetitions as used in phase 1. Using the same pre-determined interval of time or pre-determined number of repetitions may permit the analytics engine 305 to more accurate compare and analyze the data in phase 1 and phase 2. The identified application may be executed for the pre-determined interval of time or a pre-determined number of repetitions. During the execution of the application, the analytics engine 305 may obtain metrics (e.g., CPU usage data) associated with the execution of the application on the general-purpose processor 225 and/or the zIIP 230.

At block 420, the analytics engine 305 may calculate the percentage of CPU time that is zIIP for phase 2. In some embodiments, the analytics engine 305 may use the data obtained in phase 2 (block 415) or retrieved from a datastore 310 to calculate the percentage of CPU time that is associated with the execution of the application in phase 2. In some embodiments, the analytics engine 305 may compare the zIIP 230 CPU time (e.g., time the zIIP 230 was utilized during the execution of the application during phase 2) to the general-purpose processor 225 CPU time (e.g., time the general-purpose processor 225 was utilized during the execution of the application during phase 2) to obtain the percentage of CPU time that is zIIP associated with the execution of the application. In some embodiments, the amount of zIIP time used by the process during the second phase may be calculated and compared to the non-zIIP CPU time used by the process during the first phase to determine the off-load percentage. The percentage of CPU time that is zIIP may also be calculated by any other known formula.

At block 425, the analytics engine 305 may generate an efficiency percentage using data from phase 1 and the percentage of CPU time from phase 2 (e.g., calculated at block 420). In some embodiments, the efficiency percentage may be a numeric value indicative the difference in efficiency between executing the application only on a general-purpose processor 225 and executing the application by allowing zIIP-enabled processes to execute on a zIIP 230.

At block 430, the analytics engine 305 may determine whether the efficiency percentage is greater than an identified threshold. In some embodiments, the threshold may be a pre-set default value. In some embodiment, the threshold may be designated by a user or administrator of the system. In some embodiments, the threshold may be dynamically adjusted based on performance metrics analyzed by the analytics engine 305. In some embodiments, the threshold may be received from a user, such as a value designated by the user in a response to an inquiry by the analytics engine 305. In some embodiments, the threshold may be designated in the request for evaluation received from the user. In some embodiments, the threshold may be obtained from the profile associated with the user and/or software.

If at block 430, the analytics engine 305 determines that the efficiency percentage is not greater than the threshold, then at block 435, the analytics engine 305 may designate the process a not authorized to execute on a zIIP 230. In some embodiments, not authorizing the process to execute on a zIIP 230 may require no further action by the analytics engine 305. In some embodiments, the analytics engine 305 may generate metadata to associate with the process. In some embodiments, the analytics engine 305 may add data identifying the process to a table or other type of organization structure that the analytics engine 305 may reference prior to executing a process on a zIIP 230.

If at block 430, the analytics engine 305 determines that the efficiency percentage is greater than the threshold, the analytics engine 305 may designate the process as authorized for zIIP execution, as shown at block 440. In some embodiments, the analytics engine 305 may designate the process as authorized for zIIP execution by generating and associating metadata with the process. In some embodiments, the analytics engine 305 may generate metadata indicative of the authorization and may store the metadata in a storage structure, such as a table, graph, or the like. The analytics engine 305 may access the storage structure when executing the process in the future to determine whether the process is authorized. In some embodiments, the authorization may be perpetual. In some embodiments, the analytics engine 305 may set the authorization to expire at a set time or date, after a specific time duration, or after a specific condition has been met. Once the authorization has expired, the system may require re-evaluation of the process to re-authorize the process to execute on an available zIIP 230.

At block 445, the analytics engine 305 may determine whether a re-evaluation interval has been set. If a re-evaluation interval has been set, then the method may proceed back to the start when the re-evaluation interval has been satisfied. In some embodiments, the re-evaluation interval may be set to a default value. In some embodiments, re-evaluation interval may be a time interval (e.g., one week, one day, etc.) used to determine when to repeat the analysis. In some embodiments, the re-evaluation interval may be a specific date or time (e.g., 10:00 AM every Thursday, etc.) at which time the analysis should be repeated. In some embodiments, the re-evaluation interval may include one or more conditions that must be met before the method or analysis may be repeated. For example, the condition may specify that the previous analysis must have authorized at least one zIIP-enabled process or specify that the application or software have been executed a specific number of times before being analyzed again. In some embodiments, the re-evaluation interval may be specified by a user in user profile, accessed by the analytics engine 305. In some embodiments, the re-evaluation interval may be dynamically set and adjusted by the analytics engine 305 using metrics generated by the analytics engine 305. In some embodiments, the re-evaluation interval may be specified by a user at the time of a request for evaluation of one or more zIIP-enabled processes.

If at block 445, the analytics engine 305 determines that a re-evaluation interval has not been set, the method may terminate.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    executing at least a portion of an application using a general-purpose processor of a mainframe computing device, wherein the at least the portion of the application comprises a special purpose processor-enabled process;
    collecting a first set of data associated with the general-purpose processor;
    executing the at least a portion of the application using a special purpose processor of the mainframe computing device;
    collecting a second set of data associated with the special purpose processor;
    calculating an efficiency percentage using the first set of data and the second set of data;
    authorizing the at least the portion of the application to execute on the special purpose processor based on the efficiency percentage, wherein the authorization includes a re-evaluation time interval associated with the application; and
    re-evaluating the application using the re-evaluation time interval to determine whether to re-authorize the application.

2. The computer-implemented method of claim 1, further comprising:
    receiving a request to evaluate the special purpose processor-enabled processes.

3. The computer-implemented method of claim 1, further comprising:
    transmitting the first set of data and the second set of data to a datastore.

4. The computer-implemented method of claim 1, wherein calculating the efficiency percentage further comprises:
    determining a first time interval associated with executing the at least the portion of the application using the general-purpose processor of the mainframe computing device;
    determining a second time interval associated with executing the at least the portion of the application using the special purpose processor of the mainframe computing device; and
    calculating the efficiency percentage using the first time and the second time.

5. The computer-implemented method of claim 4, wherein calculating the second time interval further comprises:
    determining a period of time associated with executing the zIIP-enabled process of the application using the special purpose processor of the mainframe computing device.

6. The computer-implemented method of claim 1, wherein determining to authorize the at least the portion of the application further comprises:
    generating metadata associated with the application; and
    storing the metadata to a data structure.

7. A computer program product comprising a non-transitory storage medium readable by a processing circuit and storing instructions for execution by the processing circuit for performing a method comprising:
  executing at least a portion of an application using a general-purpose processor of a mainframe computing device, wherein the at least the portion of the application comprises a special purpose processor-enabled process;
  collecting a first set of data associated with the general-purpose processor;
  executing the at least a portion of the application using a special purpose processor of the mainframe computing device;
  collecting a second set of data associated with the special purpose processor;
  calculating an efficiency percentage using the first set of data and the second set of data;
  authorizing the at least the portion of the application to execute on the special purpose processor based on the efficiency percentage, wherein the authorization includes a re-evaluation time interval associated with the application; and
  re-evaluating the application using the re-evaluation time interval to determine whether to re-authorize the application.

8. The computer program product of claim 7, wherein the method further comprises:
  receiving a request to evaluate special purpose processor-enabled processes.

9. The computer program product of claim 7, wherein the method further comprises:
  transmitting the first set of data and the second set of data to a datastore.

10. The computer program product of claim 7, wherein calculating the efficiency percentage further comprises:
  determining a first time interval associated with executing the at least the portion of the application using the general-purpose processor of the mainframe computing device;
  determining a second time interval associated with executing the at least the portion of the application using the special purpose processor of the mainframe computing device; and
  calculating the efficiency percentage using the first time and the second time.

11. The computer program product of claim 10, wherein calculating the second time interval further comprises:
  determining a period of time associated with executing the special purpose processor-enabled process of the application using the special purpose processor of the mainframe computing device.

12. The computer program product of claim 7, wherein determining to authorize the at least the portion of the application further comprises:
  generating metadata associated with the application; and
  storing the metadata to a data structure.

13. A system, comprising:
  a general-purpose processor;
  a special purpose processor;
  the general-purpose processor in communication with one or more types of memory, the processor configured to:
  execute at least a portion of an application using a general-purpose processor of a mainframe computing device, wherein the at least the portion of the application comprises a special purpose processor-enabled process;
    collect a first set of data associated with the general-purpose processor;
    execute the at least a portion of the application using a special purpose processor of the mainframe computing device;
    collect a second set of data associated with the special purpose processor;
    calculate an efficiency percentage using the first set of data and the second set of data;
    authorizing the at least the portion of the application to execute on the special purpose processor based on the efficiency percentage, wherein the authorization includes a re-evaluation time interval associated with the application; and
    re-evaluate the application using the re-evaluation time interval to determine whether to re-authorize the application.

14. The system of claim 13, wherein the processor is further configured to:
  transmit the first set of data and the second set of data to a datastore.

15. The system of claim 13, wherein, to calculate the efficiency percentage, the processor is further configured to:
  determine a first time interval associated with executing the at least the portion of the application using the general-purpose processor of the mainframe computing device;
  determine a second time interval associated with executing the at least the portion of the application using the special purpose processor of the mainframe computing device; and
  calculate the efficiency percentage using the first time and the second time.

16. The system of claim 15, wherein, to calculate the second time interval, the processor is further configured to:
  determine a period of time associated with executing the special purpose processor-enabled process of the application using the special purpose processor of the mainframe computing device.

17. The system of claim 13, wherein, to determine to authorize the at least the portion of the application, the processor is further configured to:
  generate metadata associated with the application; and
  store the metadata to a data structure.

* * * * *